(12) United States Patent
Summerfield

(10) Patent No.: US 11,019,828 B1
(45) Date of Patent: Jun. 1, 2021

(54) PORTABLE GAME HOIST ASSEMBLY

(71) Applicant: Richard Summerfield, Glen Burnie, MD (US)

(72) Inventor: Richard Summerfield, Glen Burnie, MD (US)

(*) Notice: Subject to any disclaimer, the term of this patent is extended or adjusted under 35 U.S.C. 154(b) by 0 days.

(21) Appl. No.: 16/728,424

(22) Filed: Dec. 27, 2019

(51) Int. Cl.
*A22B 5/00* (2006.01)
*A22B 5/06* (2006.01)

(52) U.S. Cl.
CPC ...................... *A22B 5/06* (2013.01)

(58) Field of Classification Search
CPC .................................. A22B 5/00; A22B 5/06
USPC ........................................................ 452/187
See application file for complete search history.

(56) References Cited

U.S. PATENT DOCUMENTS

| | | |
|---|---|---|
| 4,432,306 A | 2/1984 | Rossa |
| 5,082,127 A | 1/1992 | Huang |
| D349,996 S | 8/1994 | Litwiller |
| 6,994,618 B1 | 2/2006 | Syers |
| 7,059,956 B1 * | 6/2006 | Summerlin ............ A22B 5/06 452/192 |
| 7,261,631 B1 | 8/2007 | Golson |
| 7,625,269 B2 | 12/2009 | Godwin |
| 7,806,755 B1 * | 10/2010 | Martinelli ............ A22B 5/06 452/187 |
| 7,931,524 B2 * | 4/2011 | McKenzie ............ B66C 23/44 452/187 |
| 8,210,912 B2 * | 7/2012 | Ugiansky ............ A22B 7/002 452/187 |
| 8,574,042 B1 | 11/2013 | Sloan | 
| 9,877,490 B1 * | 1/2018 | Lee ............ B66C 23/44 |

FOREIGN PATENT DOCUMENTS

WO    WO1999066858    12/1999

* cited by examiner

*Primary Examiner* — Richard T Price, Jr.

(57) ABSTRACT

A portable game hoist assembly includes a plurality of modular sections that is each removably coupled together to define a stand that extends vertically from a support surface. The stand has a height at least 8.0 feet to facilitate a deer or other similarly sized animal to be suspended beneath the stand for butchering. A winch is rotatably coupled to a respective one of the modular sections and a pulley is coupled to a respective one of the modular sections. The pulley is spaced upwardly from the support surface when the stand is assembled. A cable is wrapped around the winch and the cable extends around the pulley. A distal end of the cable can lift the game when the winch is rotated in the first direction. A lighting unit is coupled to the modular sections to illuminate the game for butchering.

10 Claims, 3 Drawing Sheets

PORTABLE GAME HOIST ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to game hoist devices and more particularly pertains to a new game hoist device for hoisting game to be butchered.

(2) Description of Related Art Including Information Disclosed Under 37 CFR 1.97 and 1.98

The prior art relates to game hoist devices. The prior art discloses an animal hoist which includes slings and yokes for humanely lifting an animal for medical purposes. The prior art further discloses a variety of portable game hoists that suspend game for butchering, each embodiment being constructed with only right angles. Additionally, the prior art generally involves structures that have, at most, a pair of legs that are vertically oriented, thusly lending themselves to tipping.

BRIEF SUMMARY OF THE INVENTION

An embodiment of the disclosure meets the needs presented above by generally comprising a plurality of modular sections that is each removably coupled together to define a stand that extends vertically from a support surface. The stand has a height at least 8.0 feet to facilitate a deer or other similarly sized animal to be suspended beneath the stand for butchering. A winch is rotatably coupled to a respective one of the modular sections and a pulley is coupled to a respective one of the modular sections. The pulley is spaced upwardly from the support surface when the stand is assembled. A cable is wrapped around the winch and the cable extends around the pulley. A distal end of the cable can lift the game when the winch is rotated in the first direction. A lighting unit is coupled to the modular sections to illuminate the game for butchering.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
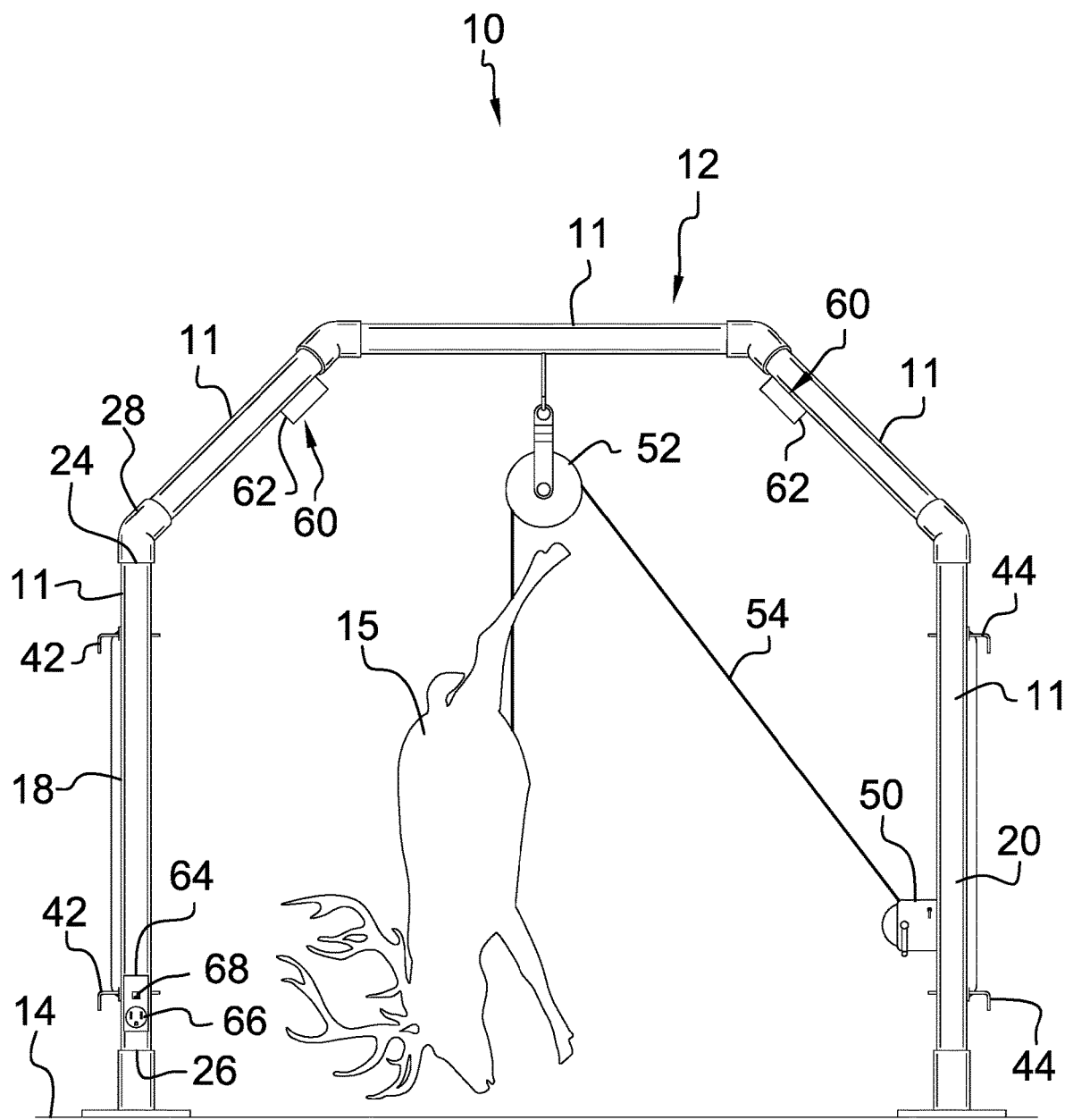
FIG. 1 is a front view of a portable game hoist assembly according to an embodiment of the disclosure.
Figure 2:
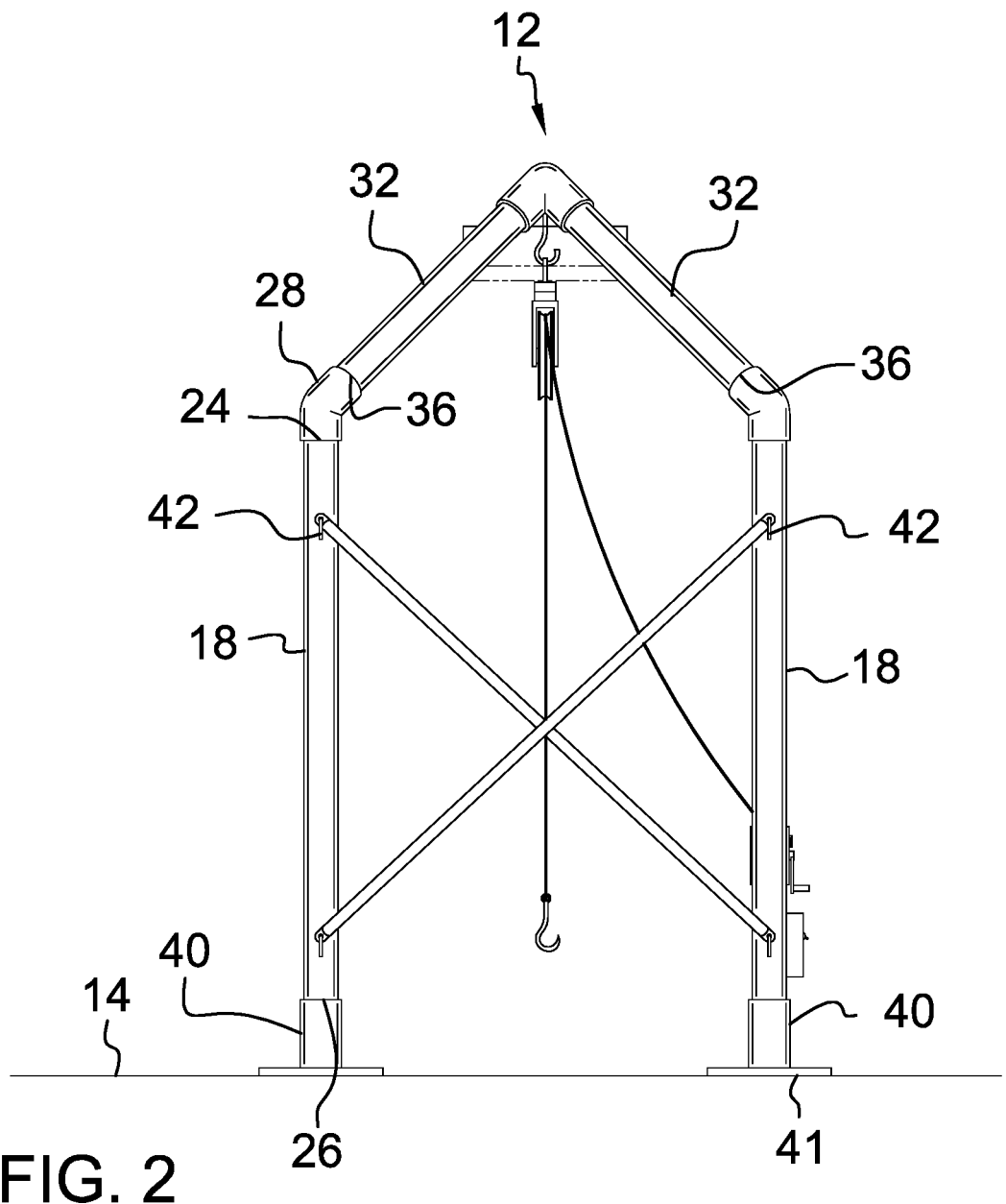
FIG. 2 is a right side view of an embodiment of the disclosure.
Figure 3:
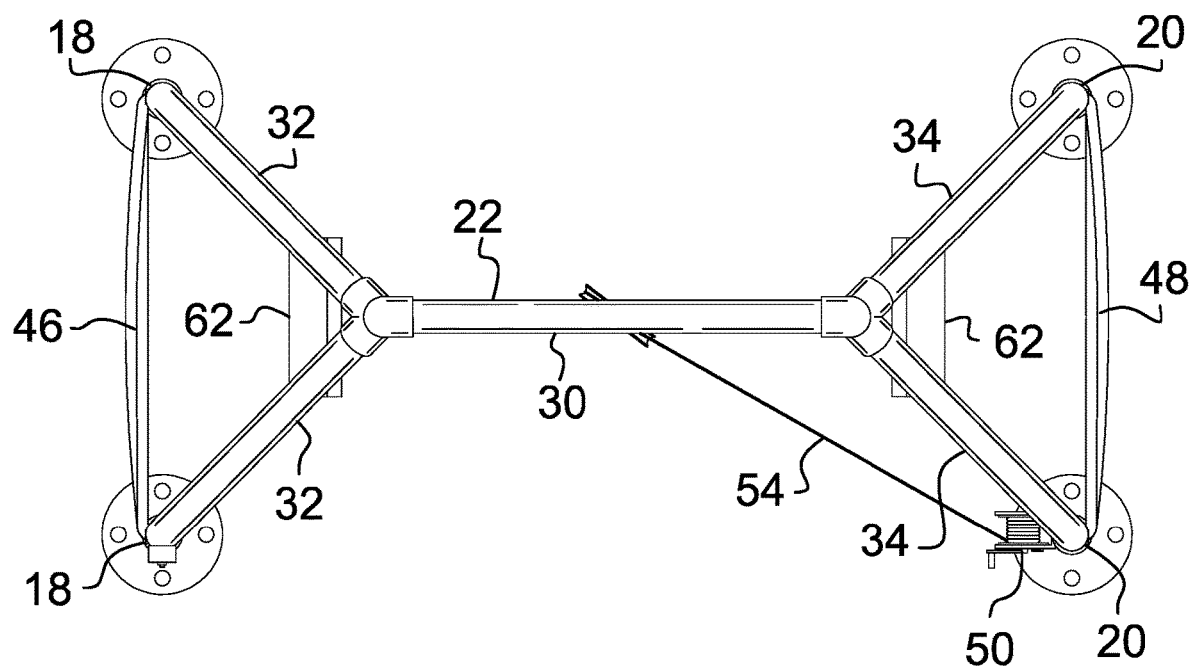
FIG. 3 is a top view of an embodiment of the disclosure.
Figure 4:
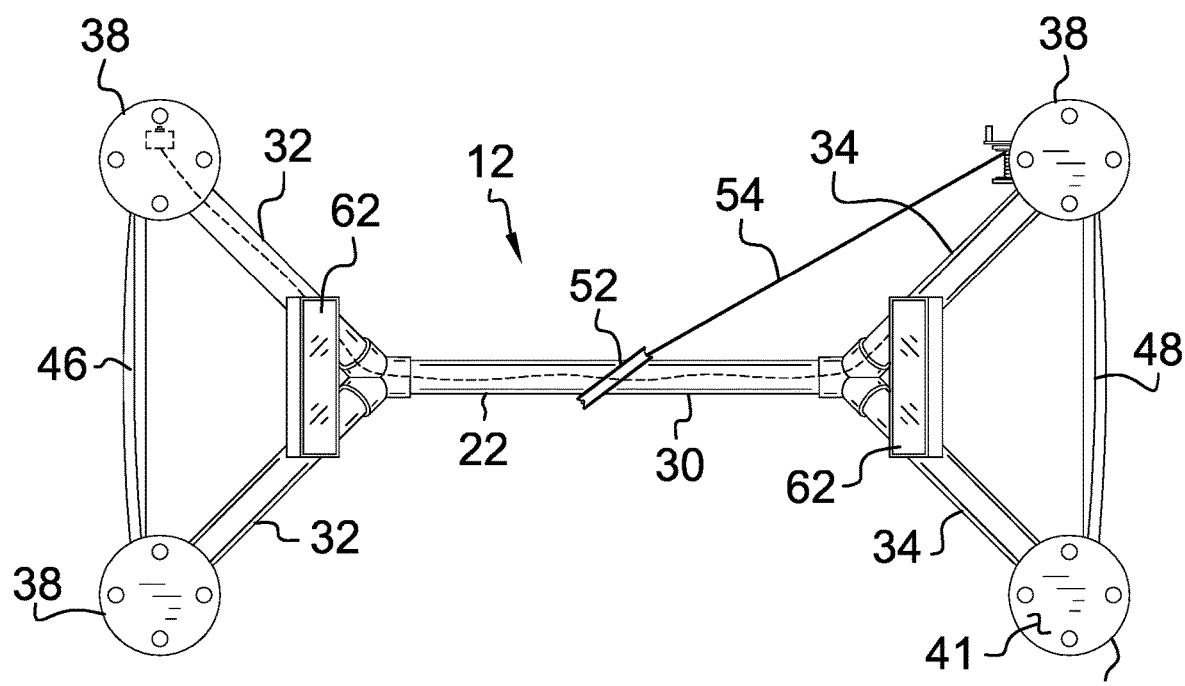
FIG. 4 is a bottom view of an embodiment of the disclosure.

With reference now to the drawings, and in particular to FIGS. 1 through 4 thereof, a new game hoist device embodying the principles and concepts of an embodiment of the disclosure and generally designated by the reference numeral 10 will be described.

As best illustrated in FIGS. 1 through 4, the portable game hoist assembly 10 generally comprises a plurality of modular sections 11 that are removably coupled together to define a stand 12 that extends vertically from a support surface 14. Additionally, the stand 12 has a height at least 8.0 feet 38 to facilitate harvested game 15, such as deer or other similarly sized animal, to be suspended beneath the stand 12 for butchering. The plurality of modular sections 11 may be comprised of pvc pipe or other rigid and suitably lightweight material to facilitate the modular sections 11 to be portable.

The plurality of modular sections 11 includes a set of first legs 18, a set of second legs 20 and a support 22. The support 22 extends between each of the first legs 18 and each of the second legs 20 when the modular sections 11 are assembled. Moreover, the support 22 is horizontally oriented and is spaced upwardly from the support surface 14 when the stand 12 is assembled. Each of the first legs 18 and the second legs 20 has a top end 24 and a bottom end 26, and each of the first legs 18 and the second legs 20 has a coupler 28 disposed on the top end 24. The coupler 28 on each of the first legs 18 and the second legs 20 angles away from an axis extending through the top end 24 and the bottom end 26 of the respective first leg or second leg.

The support 22 includes a central member 30 extending between a pair of first angled members 32 and a pair of second angled members 34. Each of the first angled members 32 angles downwardly from the central member 30. The first angled members 32 angle away from each other such that the first angled members 32 forms a Y shape with the central member 30. Each of the second angled members 34 angles downwardly from the central member 30. The second angled members 34 angle away from each other such that the second angled members 34 forms a Y shape with the central member 30.

Each of the first angled members 32 and the second angled members 34 has a distal end 36 with respect to the central member 30. The distal end 36 of each of the first angled members 32 removably engages the coupler 28 on a respective one of the first legs 18. The distal end 36 of each of the second angled members 34 removably engages the coupler 28 on a respective one of the second legs 20. A plurality of feet 38 is each removably coupled to the bottom end 26 of a respective one of the first legs 18 and the second legs 20. Each of the feet 38 has a receiver 40 and a bottom surface 41. The receiver 40 insertably receives the bottom end 26 of the respective first legs 18 and second legs 20 and the bottom surface 41 rests on the support surface 14.

A set of first pins 42 is each removably insertable into a respective one of the first legs 18. Each of the first pins 42 is positionable adjacent to a respective one of the top end 24 or the bottom end 26 of the respective first leg 18. A set of second pins 44 is each removably insertable into a respective one of the second legs 20. Each of the second pins 44 is positionable adjacent to a respective one of the top end 24 or the bottom end 26 of the respective second leg 20.

A pair of first braces 46 is each coupled between a respective pair of the first pins 42 to inhibit the first legs 18 from moving away from each other. A pair of second braces 48 is each coupled between a respective pair of the second pins 44 to inhibit the second legs 20 from moving away from each other. The first braces 46 and the second braces 48 may be arranged in an X pattern for enhanced stability.

A winch 50 is rotatably coupled to a respective one of the modular sections 11 and the winch 50 is rotatable in a first direction or a second direction. The winch 50 may be a manual cable 54 winch of any conventional design that includes a crank and a spool. A pulley 52 is coupled to a respective one of the modular sections 11 and the pulley 52 is spaced upwardly from the support surface 14 when the stand 12 is assembled. Moreover, the pulley 52 is centrally positioned on the central member 30 of the support 22. A cable 54 is wrapped around the winch 50 and extends around the pulley 52 such that a distal end 56 of the cable 54 can lift game 15 when the winch 50 is rotated in the first direction. A grapple 58, such as a meat hook or the like, is coupled the distal end 56 of the cable 54 for fastening to the game 15.

A lighting unit 60 is provided and the lighting unit 60 is coupled to the modular sections 11. The lighting unit 60 emits light when the lighting unit 60 is turned on. In this way the lighting unit 60 can illuminate the game 15 for butchering. The lighting unit 60 comprises a pair of light emitters 62 that is each coupled to the support 22. Each of the light emitters 62 extends between a respective pair of the first angled members 32 or the pair of second angled members 34 of the support 22. Additionally, each of the light emitters 62 is directed downwardly when the stand 12 is assembled. The light emitters 62 may each comprise an LED or other type of electronic light source.

The lighting unit 60 includes a power box 64 that is coupled to a respective one of the first legs 18. The power box 64 is electrically coupled to each of the light emitters 62 and the power box 64 has an electrical inlet 66 positioned thereon. The electrical inlet 66 insertably receives a power cord, such as an extension cord or the like, for supplying electrical power to the power box 64. A power switch 68 is movably coupled to the power box 64, the power switch 68 is electrically coupled to each of the light emitters 62 and the power switch 68 turns the light emitters 62 on and off.

In use, the stand 12 is assembled when a deer, or other similarly sized game 15, has been harvested for butchering. In this way the deer, or other similarly sized game 15, can be hung up for butchering in a location that does not have trees or other suitable location for hanging game 15. The grapple on the cable 54 is attached to the game 15 and the winch 50 is rotated in the first direction to lift the game 15 for subsequent butchering. Additionally, the light emitters 62 can be turned on to illuminate the game 15. The stand 12 can be dissembled for transportation or storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable game hoist assembly being configured to hoist game for butchering, said assembly comprising:

a plurality of modular sections, each of said modular sections being removably coupled together to define a stand that extends vertically from a support surface, said stand having a height at least 8.0 feet wherein said stand is configured to facilitate a deer or other similarly sized animal to be suspended beneath said stand for butchering, said plurality of modular sections including a set of first legs, a set of second legs and a support, said support including a central member extending between a pair of first angled members and a pair of second angled members, said support extending between each of said first legs and each of said second legs when said modular sections are assembled such that said support is horizontally oriented and spaced upwardly from the support surface, wherein each of said first legs and said second legs has a top end and a bottom end, each of said first legs and said second legs has a coupler being disposed on said top end, said coupler on each of said first legs and said second legs angling away from an axis extending through said top end and said bottom end of said respective first leg or second leg;

a winch being rotatably coupled to a respective one of said modular sections;

a pulley being coupled to a respective one of said modular sections, said pulley being spaced upwardly from the support surface when said stand is assembled;

a cable being wrapped around said winch, said cable extending around said pulley wherein a distal end of said cable is configured to lift game when said winch is rotated in said first direction;
a lighting unit being coupled to said modular sections, said lighting unit emitting light when said lighting unit is turned on wherein said lighting unit is configured to illuminate the game for butchering;
each of said first angled members being angled downwardly from said central member, said first angled members angling away from each other such that said first angled members forms a Y shape with said central member;
each of said second angled members being angled downwardly from said central member, said second angled members angling away from each other such that said second angled members forms a Y shape with said central member;
each of said first angled members and said second angled members having a distal end with respect to said central member, said distal end of each of said first angled members removably engaging said coupler on a respective one of said first legs, said distal end of each of said second angled members removably engaging said coupler on a respective one of said second legs; and
a plurality of feet, each of said feet being removably coupled to a said bottom end of a respective one of said first legs and said second legs, each of said feet having a receiver and a bottom surface, said receiver insertably receiving said bottom end of said respective first legs and second legs wherein said bottom surface is configured to rest on the support surface.

2. The assembly according to claim 1, further comprising a set of first pins, each of said first pins being removably insertable into a respective one of said first legs, each of said first pins being positioned adjacent to a respective one of said top end or said bottom end of said respective first leg.

3. The assembly according to claim 2, further comprising a set of second pins, each of said second pins being removably insertable into a respective one of said second legs, each of said second pins being positioned adjacent to a respective one of said top end or said bottom end of said respective second leg.

4. The assembly according to claim 3, further comprising a pair of first braces, each of said first braces being coupled between a respective pair of said first pins to inhibit said first legs from moving away from each other.

5. The assembly according to claim 4, further comprising a pair of second braces, each of said second braces being coupled between a respective pair of said second pins to inhibit said second legs from moving away from each other.

6. The assembly according to claim 3, wherein:
said winch is rotatable in a first direction or a second direction;
said pulley is centrally positioned on said central member of said support;
said distal end of said cable has a grapple being coupled thereto for fastening to the game.

7. The assembly according to claim 1, wherein said lighting unit comprises a pair of light emitters, each of said light emitters being coupled to said support, each of said light emitters extending between a respective pair of said first angled members or said pair of second angled members of said support, each of said light emitters being directed downwardly when said stand is assembled.

8. The assembly according to claim 7, wherein said lighting unit includes a power box being coupled to a respective one of said first legs, said power box being electrically coupled to each of said light emitters, said power box having an electrical inlet being positioned thereon, said electrical inlet insertably receiving a power cord for supplying electrical power to said power box.

9. The assembly according to claim 8, wherein said lighting unit includes a power switch being movably coupled to said power box, said power switch being electrically coupled to each of said light emitters, said power switch turning said light emitters on and off.

10. A portable game hoist assembly being configured to hoist game for butchering, said assembly comprising:
a plurality of modular sections, each of said modular sections being removably coupled together to define a stand that extends vertically from a support surface, said stand having a height at least 8.0 feet wherein said stand is configured to facilitate a deer or other similarly sized animal to be suspended beneath said stand for butchering, said plurality of modular sections including a set of first legs, a set of second legs and a support, said support extending between each of said first legs and each of said second legs when said modular sections are assembled such that said support is horizontally oriented and spaced upwardly from the support surface, each of said first legs and said second legs having a top end and a bottom end, each of said first legs and said second legs having a coupler being disposed on said top end, said coupler on each of said first legs and said second legs angling away from an axis extending through said top end and said bottom end of said respective first leg or second leg, said support including a central member extending between a pair of first angled members and a pair of second angled members, each of said first angled members angling downwardly from said central member, said first angled members angling away from each other such that said first angled members forms a Y shape with said central member, each of said second angled members angling downwardly from said central member, said second angled members angling away from each other such that said second angled members forms a Y shape with said central member, each of said first angled members and said second angled members having a distal end with respect to said central member, said distal end of each of said first angled members removably engaging said coupler on a respective one of said first legs, said distal end of each of said second angled members removably engaging said coupler on a respective one of said second legs;
a plurality of feet, each of said feet being removably coupled to a said bottom end of a respective one of said first legs and said second legs, each of said feet having a receiver and a bottom surface, said receiver insertably receiving said bottom end of said respective first legs and second legs wherein said bottom surface is configured to rest on the support surface;
a set of first pins, each of said first pins being removably insertable into a respective one of said first legs, each of said first pins being positioned adjacent to a respective one of said top end or said bottom end of said respective first leg;
a set of second pins, each of said second pins being removably insertable into a respective one of said second legs, each of said second pins being positioned adjacent to a respective one of said top end or said bottom end of said respective second leg;

a pair of first braces, each of said first braces being coupled between a respective pair of said first pins to inhibit said first legs from moving away from each other;

a pair of second braces, each of said second braces being coupled between a respective pair of said second pins to inhibit said second legs from moving away from each other;

a winch being rotatably coupled to a respective one of said modular sections, said winch being rotatable in a first direction or a second direction;

a pulley being coupled to a respective one of said modular sections, said pulley being spaced upwardly from the support surface when said stand is assembled, said pulley being centrally positioned on said central member of said support;

a cable being wrapped around said winch, said cable extending around said pulley wherein a distal end of said cable is configured to lift game when said winch is rotated in said first direction, said distal end having a grapple being coupled thereto for fastening to the game; and a lighting unit being coupled to said modular sections, said lighting unit emitting light when said lighting unit is turned on wherein said lighting unit is configured to illuminate the game for butchering, said lighting unit comprising:

a pair of light emitters, each of said light emitters being coupled to said support, each of said light emitters extending between a respective pair of said first angled members or said pair of second angled members of said support, each of said light emitters being directed downwardly when said stand is assembled;

a power box being coupled to a respective one of said first legs, said power box being electrically coupled to each of said light emitters, said power box having an electrical inlet being positioned thereon, said electrical inlet insertably receiving a power cord for supplying electrical power to said power box; and a power switch being movably coupled to said power box, said power switch being electrically coupled to each of said light emitters, said power switch turning said light emitters on and off.

\* \* \* \* \*